S. A. EKEHORN.
CENTER TUBE FOR CENTRIFUGAL SEPARATORS.
APPLICATION FILED JULY 24, 1909.

991,707.

Patented May 9, 1911.

Witnesses

Inventor
Sven August Ekehorn
by B. Singer
Att'y

UNITED STATES PATENT OFFICE.

SVEN AUGUST EKEHORN, OF GEFLE, SWEDEN.

CENTER TUBE FOR CENTRIFUGAL SEPARATORS.

991,707.      Specification of Letters Patent.      Patented May 9, 1911.

Application filed July 24, 1909. Serial No. 509,427.

*To all whom it may concern:*

Be it known that I, SVEN AUGUST EKEHORN, a subject of the King of Sweden, and residing at Gefle, Sweden, have invented certain new and useful Improvements in Center Tubes for Centrifugal Separators, of which the following is a specification.

The present invention refers to an improvement in such centrifugal separators in which the spindle is inserted into the lower part of the center tube by means of a tap. On account of this one must consider an arrangement of the outlet into the drum in such a manner that the milk can be conducted right down into the lower part of the drum, as otherwise a uniform distribution of the milk cannot be effected.

The invention consists therein that sloping channels are arranged in the lower part of the center tube, outside the spindle tap, these channels leading from the bottom of the milk inlet are provided with a slit extending along their outer walls to the top of the plate through which the milk is carried out into the insertion plates. These channels may besides be made so that they continue above the bottom of the milk inlet in its wall and form open tracks along it, which tracks serve for collecting and bringing down the milk. Besides that, in order to properly facilitate the practical working of the arrangement, the bottom of the center tube and drum may be made in separate parts which are united with each other by means of a proper arrangement of screws.

Figure 1:
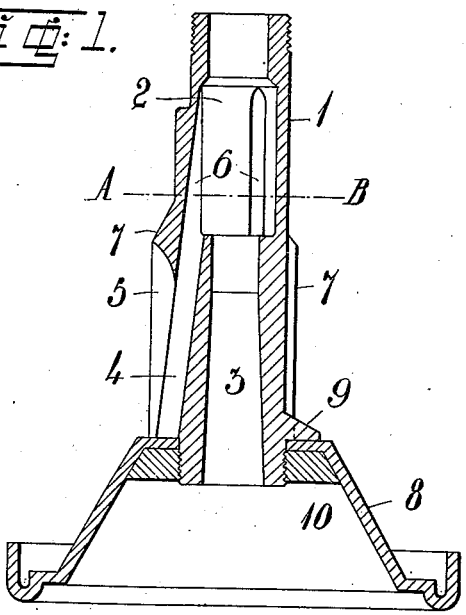
Figure 2:
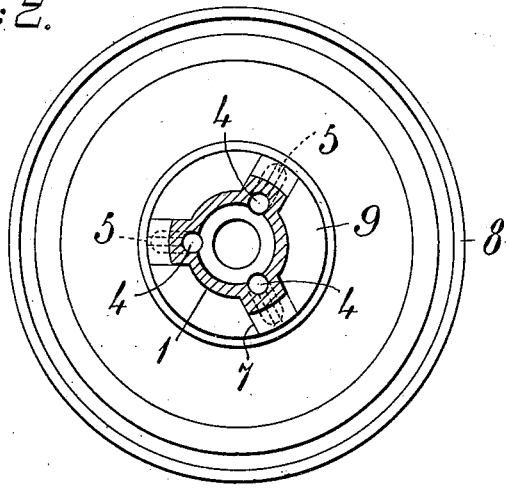

The invention is shown in one constructional form in the attached drawing so that Figure 1 shows the center tube with attached drum-bottom in a vertical section, while Fig. 2 is a level section along line A to B (Fig. 1).

1 is the center tube which at the top is provided with the usual downward boring 2 for letting in the milk, and at the bottom with an outward opening 3 for the spindle tap. According to the invention channels 4 are arranged in the lower part of the center tube and, running obliquely downward, these channels are provided along their outer walls with slits through which they are in connection with the drum. In the style shown the holes 4 continue with depressions or grooves 6 in the wall of the boring 2, which grooves serve for collecting and bringing down the milk, whereafter the latter is spread out between the plates by means of the channels and slits 5. The holes 4 with the slits 5 are suitably made in the usual springs 7 on the center tube, but can of course also be made at any other place, for example in the portions between the flanges of the tube.

In order to facilitate the practical boring of holes 4 and the cutting of slits 5, center tube 1 and the bottom of the drum 8 may suitably be made in separate pieces. The center tube is provided with a flange 9, against which the bottom of the drum rests, and has a screw thread cut in its lower part. Nut 10 is screwed upon the center tube and fits into the bottom of the wall and is in consequence thereof made conical, whereby, on tightening the nut, a good centering of the bottom of the drum to the center tube and a rigid connection of the same is effected. The milk coming from outlet 2 is on account of the position of channels 4, pressed down along the walls of these channels and flows, during the whole of this movement out through slits 5 which occupy the whole height of the inserted plates, by reason of which a completely uniform distribution of the milk and also a quicker outflow of the same is effected. Besides these advantages several others are gained. The cost of manufacture can be considerably reduced, besides which the inside of the channels as well as the center tube are accessible, whereby the advantage is gained that no milk particles stick to the inside of the tube, as the latter can get an absolutely smooth surface. Furthermore cleaning of the tube is extremely easy.

Having now particularly described and ascertained the nature of the said invention and in what manner the same is to be performed I declare that what I claim is:

In combination with the drum of a centrifugal separator, a center tube detachably fastened to the bottom of the drum, said tube having an inlet chamber for inflowing liquid in its upper portion, and channels extending from said inlet chamber in slanting direction through the wall of the tube to the bottom of the drum, said channels opening in radial direction outwardly the openings extending from below the inlet chamber to the bottom of the drum, the inlet chamber being provided with grooves extending longitudinally from the openings of said channels, the inner surface of wall of the tubing below the inlet chamber being smooth and uninterrupted.

In testimony whereof I have signed my name to this specification in the presence of two subscribing witnesses.

SVEN AUGUST EKEHORN.

Witnesses:
A. G. VERZGREN,
WILHELM RUNSTEDT.

Copies of this patent may be obtained for five cents each, by addressing the "Commissioner of Patents, Washington, D. C."